(12) United States Patent
Meier et al.

(10) Patent No.: US 10,871,266 B2
(45) Date of Patent: Dec. 22, 2020

(54) LIGHT GUIDE, LIGHTING DEVICE AND VEHICLE PART

(71) Applicant: SMR Patents S.A.R.L., Luxembourg (LU)

(72) Inventors: Eugen Meier, Ditzingen (DE); David Derry Chamberlain, Hampshire (GB); Robert Shepherd, Surrey (GB)

(73) Assignee: SMR Patents S.à.r.l, Luxembourg (LU)

( * ) Notice: Subject to any disclaimer, the term of this patent is extended or adjusted under 35 U.S.C. 154(b) by 348 days.

(21) Appl. No.: 15/556,718

(22) PCT Filed: Mar. 8, 2016

(86) PCT No.: PCT/IB2016/051290
§ 371 (c)(1),
(2) Date: Sep. 8, 2017

(87) PCT Pub. No.: WO2016/142845
PCT Pub. Date: Sep. 15, 2016

(65) Prior Publication Data
US 2018/0106446 A1 Apr. 19, 2018

(30) Foreign Application Priority Data
Mar. 10, 2015 (EP) ................................. 15158518

(51) Int. Cl.
*F21S 43/241* (2018.01)
*D03D 15/00* (2006.01)
(Continued)

(52) U.S. Cl.
CPC .......... *F21S 43/241* (2018.01); *B60Q 1/0076* (2013.01); *B60Q 1/2665* (2013.01);
(Continued)

(58) Field of Classification Search
CPC ........ F21S 43/241; F21S 43/247; F21S 43/14; F21S 43/245; B60Q 1/0076; B60Q 1/38;
(Continued)

(56) References Cited

U.S. PATENT DOCUMENTS 4,234,007 A 11/1980 Daniel
9,116,274 B2* 8/2015 Parker .................... F21S 2/005
(Continued)

FOREIGN PATENT DOCUMENTS

DE 19748636 A1 6/1999
DE 202006006387 8/2006
(Continued)

*Primary Examiner* — Bao Q Truong
*Assistant Examiner* — Glenn D Zimmerman
(74) *Attorney, Agent, or Firm* — Jones Day

(57) ABSTRACT

This relates to a light guide for a lighting device for a vehicle, including at least one woven flat body and a plurality of optical fibers, which at least partly build the flat body. All or some of the optical fibers comprise at least one coupling section. Each coupling section is disposable or disposed in a socket of the lighting device to receive light from a light source of the lighting device. The optical fibers include at least one light decoupling section being part of at least one illumination section of the woven flat body. The woven flat body and/or the at least one light decoupling section of the optical fibers include at least one reflecting element to decouple light from the optical fibers.

19 Claims, 3 Drawing Sheets

(51) Int. Cl.
*D03D 1/00* (2006.01)
*F21S 43/247* (2018.01)
*F21S 43/14* (2018.01)
*F21S 43/245* (2018.01)
*B60Q 1/00* (2006.01)
*B60Q 1/26* (2006.01)
*B60Q 1/38* (2006.01)
*F21Y 113/17* (2016.01)
*F21Y 115/10* (2016.01)

(52) U.S. Cl.
CPC .............. *B60Q 1/2696* (2013.01); *B60Q 1/38* (2013.01); *D03D 1/00* (2013.01); *D03D 15/00* (2013.01); *F21S 43/14* (2018.01); *F21S 43/245* (2018.01); *F21S 43/247* (2018.01); *D10B 2401/20* (2013.01); *D10B 2505/12* (2013.01); *F21Y 2113/17* (2016.08); *F21Y 2115/10* (2016.08)

(58) Field of Classification Search
CPC ...... B60Q 1/2696; B60Q 1/2665; D03D 1/00; D03D 15/00; F21Y 2115/10; F21Y 2113/17; D10B 2505/12; D10B 2401/20
See application file for complete search history.

(56) References Cited

U.S. PATENT DOCUMENTS

| | | | |
|---|---|---|---|
| 2004/0027481 A1* | 2/2004 | Asai | H04N 5/2256 348/372 |
| 2011/0176326 A1* | 7/2011 | Stephan | G02B 6/0008 362/555 |
| 2011/0203533 A1* | 8/2011 | Hurwitz | A01K 27/004 119/794 |
| 2011/0269358 A1* | 11/2011 | Peng | D03D 1/0088 442/59 |
| 2014/0039379 A1* | 2/2014 | Rogers | A61N 5/062 604/20 |
| 2014/0140091 A1* | 5/2014 | Vasylyev | G02B 6/001 362/606 |
| 2015/0177436 A1* | 6/2015 | Zimmermann | D03D 1/00 362/510 |

FOREIGN PATENT DOCUMENTS

| | | |
|---|---|---|
| DE | 102012013105 A1 | 1/2014 |
| EP | 1106910 A2 | 6/2001 |
| GB | 2427955 A | 1/2007 |

* cited by examiner

LIGHT GUIDE, LIGHTING DEVICE AND VEHICLE PART

CROSS-REFERENCE TO RELATED APPLICATIONS

This application is a National Stage of International Application No. PCT/IB2016/051290, filed Mar. 8, 2016, which claims priority of European Application EP 15158518.9, filed Mar. 10, 2015, all of the above applications hereby incorporated herein by reference.

TECHNICAL FIELD

The invention relates to a light guide for a lighting device for a vehicle.

BACKGROUND

Light guides, in particular for lighting devices for vehicles, are known by the state of the art i. e. in the technical field of rear view mirrors of vehicles. The known light guides in rear view mirrors are used for turning signals by guiding light from a light source through an illumination portion of the light guide. Further there are known several lighting devices as exterior or interior lights of vehicles using lenses or light guides to provide the function of the respective light, i.e. headlight, back light, indirect lighting, etc.

The known light guides for lighting devices in vehicles need a voluminous body space, which has to be hold for in the respective vehicle part.

Light guides made out of woven optical fibers for the use on the outer surface of aircrafts are known by US 2004/0037091 A1.

SUMMARY

The invention relates to a light guide for a lighting device for a vehicle, comprising at least one woven flat body and a plurality of optical fibers, which at least partly build the flat body, wherein all or some of the optical fibers comprise at least one coupling section, each coupling section is disposable or disposed in a socket of the lighting device to receive light from a light source of the lighting device, and wherein the optical fibers comprise at least one light decoupling section being part of at least one illumination section of the woven flat body. The invention further relates to a lighting device with such a light guide and a vehicle part with such a light guide and/or such a lighting device.

It is the purpose of one embodiment of the invention to provide a light guide for vehicles that is space-saving and that provides an improved light decoupling behavior.

The task is achieved by an above mentioned light guide, which is characterized in that the at least one light decoupling section of the optical fibers comprises at least one reflecting element to decouple light from the optical fibers.

The optical fibers are fixed to the socket by the coupling section of the optical fibers. In the socket the coupling sections of the optical fibers are aligned to receive light from a light source and to input said light into the optical fibers. In principle the coupling sections of the optical fibers can be fixed in the socket in such a manner that their direction of extension is cross or angular to the direction of beam of the light source. It is preferred that the direction of beam of the light source and the direction of extension of the optical fibers are parallel to each other.

By having the at least one reflective element in the woven flat body and/or in the at least one light decoupling section of the optical fibers the emitting behavior of the light guide can be improved. Further, by using a woven flat body comprising at least partly the plurality of optical fibers the light guide is compact and space-saving.

The woven flat body can comprise non-optical fibers, in particular fiberglass, Kevlar, carbon and/or cotton. In such a case the optical fibers and the non-optical fibers build a fabric. As the non-optical fibers can be made of fiberglass, Kevlar, carbon and/or cotton the light guide can be used as a hardcover or flexible cover for a vehicle part. Therefore, the system of cover of a vehicle part and of light guide attached to the cover can be designed by a reduced number of components.

The woven flat body can comprise at least one reflecting element to decouple light from the optical fibers.

Generally, the reflecting elements can be realized in any manner as long as they provide the ability to reflect light. The reflecting element can be realized easy and cost-efficient if the at least one reflecting element comprises reflecting threads, shreds or particles, in particular having a metallic surface.

To increase the life circle of a light guide it is advantageously if light guide has a protection layer, which comprises a, in particular translucent, opaque and/or colored, coating and/or that the light guide comprises an additional, in particular translucent, opaque and/or colored, coating.

The ability of emitting a light can be increased if some or all of the optical fibers comprise a reflecting end portion.

In principle only one illumination section can be provided by the light guide. To increase the applicability of the light guide it is advantageously if first optical fibers are disposed in or at a first socket and comprise a first light decoupling section being part of a first illumination section of the woven flat body, if second optical fibers are disposed in or at a second socket and comprising a second light decoupling section being part of a second illumination section of the woven flat body and/or if further optical fibers are disposed in or at a further socket and comprising a further light decoupling section being part of a further illumination section of the woven flat body.

By having first optical fibers, second optical fibers and/or further optical fibers or plurality of illumination section can be illuminated. Doing so, the light guide can be used as turn signal using the first illumination section and light spot display, using the second illumination section, and as bending light in the further illumination section, having a single light guide. As the first optical fibers are disposed in or at a first socket and the second optical fibers are disposed in or at a second socket said fibers can be illuminated by light comprising different colors. Therefore the first and the second illumination section can be placed on the same section of the woven flat body building a multi-color arrangement. Therefore, a compact and space-saving display unit for emergency vehicles can be provided.

Also, the first illumination section and the second illumination section can be adapted to create colored streams of color, or segments of different color, wherein the first illumination section and the second illumination section can be adapted to be turned off or on independently. The light source, for example, a LED light could dictate the emitted light color. Advantageously, such arrangements could find application in emergency vehicle flashing light, for example in blue in combination with an amber indicator. Others might, for example, include green for doctors in the UK.

Also, the woven flat body can be made flexible or stiff and/or the woven body can be, in particular solvable, attachable on a vehicle part or can be integrated as insolvable body, in particular building an outer cover before a vehicle part.

Also, the woven flat body can be constructed as tight sinusoidal wave for creating an effect of multiple light sources, preferably wherein the light output is consistent along the illuminated length. The term "constructed as tight sinusoidal wave" can be used to refer to a mounting situation where the woven flat body is arranged in different horizontal levels following a sinusoidal wave.

Here, for example, sections of the mirror or camera scalb could create the broken effect of multiple light sources. Advantageously, this type of construction makes non-orthodox light illumination feasible.

The woven flat body could be also constructed as a flexible tube enabling the illumination section to be guided into position. This enables a very flexible solution for production that can also be removed for maintenance or repair.

For allowing the woven flat body to be installed in components having limited installation space, the woven flat body could be adapted to enable curved sections to be created with a radius of curvature of 5 mm or less.

Further, the task also can be solved by a lighting device for a vehicle comprising at least one light source, in particular a light emitting diode (LED), at least one socket for receiving light from the light source and at least one light guide, comprising at least one woven flat body and a plurality of optical fibers which at least partly build the flat body, wherein all or some of the optical fibers comprise at least one coupling section, each coupling section is disposable or disposed in or at the at least one socket to receive light from the light source, and wherein the optical fibers comprise at least one light decoupling section being part of at least one illumination section of the woven flat body, wherein the woven flat body and/or the at least one light decoupling section of the optical fibers comprise at least one reflecting element to decouple light from the optical fibers.

Further, the lighting device can comprise at least one optic element, in particular a lens, prism, filter and/or reflector, disposed between the/each light source and each/the socket to interact with the light emitted by the light source.

To extend the applicability of the lighting device it has been found advantageously if the lighting device comprises at least one control unit to at least regulate the intensity and/or color of the respective light emitted by at least one of the at least one light source.

Generally, the at least one light source can be realized by any light source emitting light that is visible for human beings. In one embodiment of the lighting device it is preferred that the at least one light source comprises at least one light emitting diode (LED), in particular an RGB tri colour LED for variable output color.

By using a light emitting diode the light emitted by the diode is mainly adjusted in one direction. Therefore, the percentage of input of light emitted by the LED is high.

Further, it has been found advantageously if the lighting device comprises a plurality of light sources, optic elements, sockets and bundles of optical fibers, first optical fibers being disposed in or at a first socket and comprising a first light decoupling section being part of a first illumination section of the woven flat body, second optical fibers being disposed in or at a second socket and comprising a second light decoupling section being part of a second illumination section of the woven flat body and/or further optical fibers being disposed in or at a further socket and comprising a further light decoupling section being part of a further illumination section of the woven flat body.

Also, in one embodiment of the lighting device it is preferred that the light source is located away from the illumination section, preferably the light source is located several meters away from the illumination section, and/or wherein the light source is located in a dry area of the vehicle, whereas the illumination section is located in a wet area of the vehicle. Advantageously, the optical fibers can be passed through door hinges and sections of an automotive vehicle with no loss of illumination level.

In addition, the task is solved by a vehicle part, as rear view mirror, external camera, camera pod, turning signal such as side direction-indicator, interior light, front- and/or backlight comprising a Lighting device and/or a light guide.

Finally it has been found advantageously, if the vehicle part comprises an outer cover the woven flat body is, in particular solvable, attached to, the woven flat body builds the outer cover or the woven flat body is integrated as insolvable part to the outer cover.

The light guide, the lighting and the vehicle part are advantages in several aspects:

By building the light guide out of a woven flat body comprising a plurality of optical fibers the light guide can be build compact and space-saving.

By using at least one reflecting element in the woven flat body and/or in the at least one light decoupling section of the optical fibers, the coupling of light can be increased. However, just for transmitting the light, there is no need to have a metallic backing or reflective material to help transmission of the light.

By using a plurality of light sources, sockets and bundles of optical fibers the applicability of the light guide can be increased.

By building the cover of a vehicle part out of the light guide the number of several parts of the vehicle part can be produced with a reduced number of components.

The high intensity light output from the end of the optical fibers makes the lighting device highly suitable as a side direction-indicator, as fitted to a rear view mirror or camera pod.

BRIEF DESCRIPTION OF THE DRAWINGS

The various advantages of the present invention will become apparent to a person skilled in the art by reading the following specification and sub-joined claims and by reference in the following drawings:

DESCRIPTION

Figure 1:
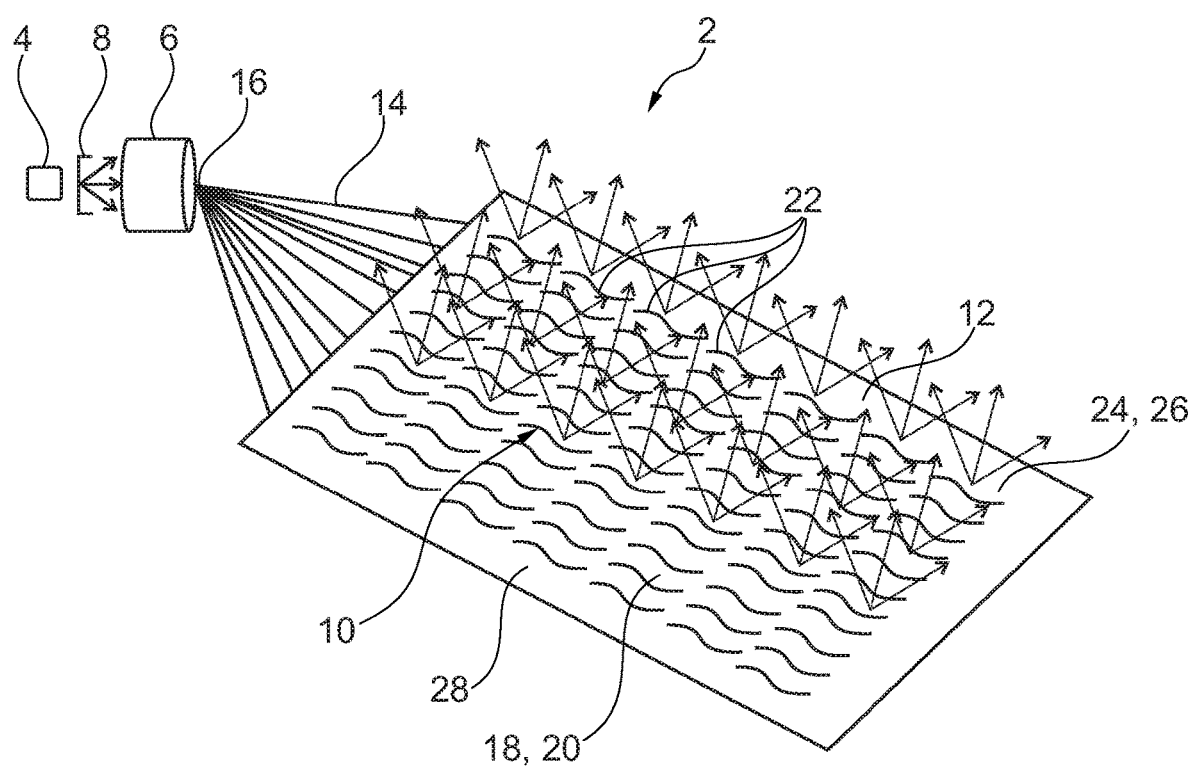
FIG. 1 is a schematic illustration of a lighting device.

The figures show an embodiment of a lighting device 2. The lighting device 2 comprises a light source 4 emitting light in direction of a socket 6. Between the light source 4 and the at least one socket 6 an optic element 8 is disposed. In the embodiment shown in the figures the light source 4 comprises a light emitting diode (LED) and the optic element 8 comprises a lens.

The lighting device 2 further comprises a light guide 10 comprising a woven flat body 12 and a plurality of optical fibers 14, which at least partly build the flat body 12. The plurality of optical fibers 14 provide a coupling section 16, each coupling section 16 disposed in the socket 6 to receive light from the light source 4. Further, the optical fibers 14 comprise a light decoupling section 18 being a part of an illumination section 20 of the woven flat body 12.

To increase the light decoupling, the woven flat body 12 and/or the at least one light decoupling section 18 over the optical fibers 14 comprise at least one reflecting element 22.

Figure 2:
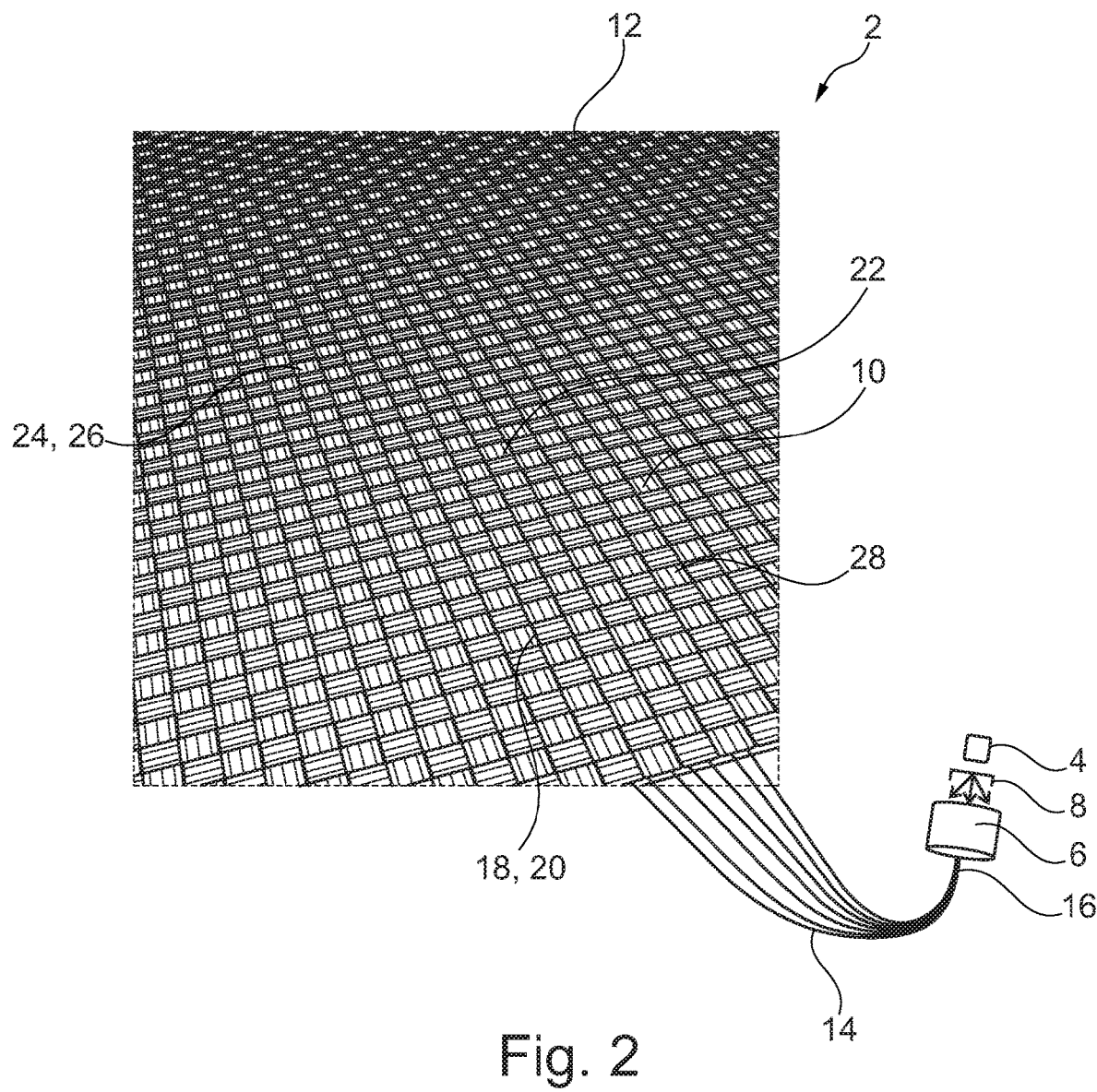
FIG. 2 is a further schematic illustration of the lighting device according to FIG. 1.

To increase the light circle of the light guide 10, the light guide comprises a translucent protection layer 24 is realized by the embodiment shown in FIGS. 1 and 2 by a translucent coating 26.

Further, the woven flat body 12 comprises a plurality of non-optical fibers 28 when build with the optical fibers 14 fabric.

Figure 3A:
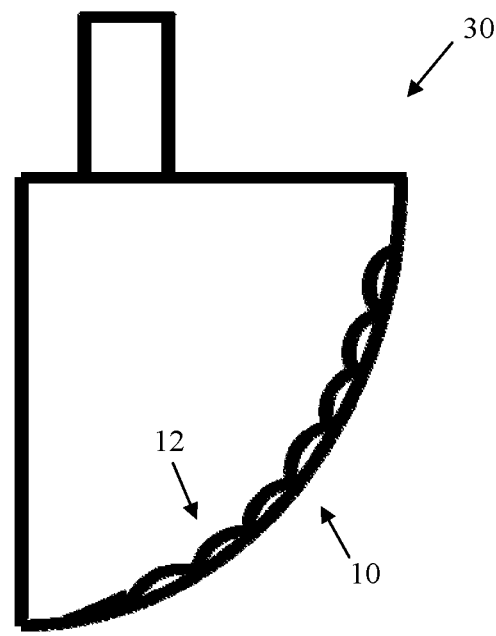
FIGS. 3a, 3b are a top view cross section and a front schematic view of a rear view device having a light-guide comprising a woven flat body that is constructed as tight sinusoidal wave installed thereon.
Figure 3B:
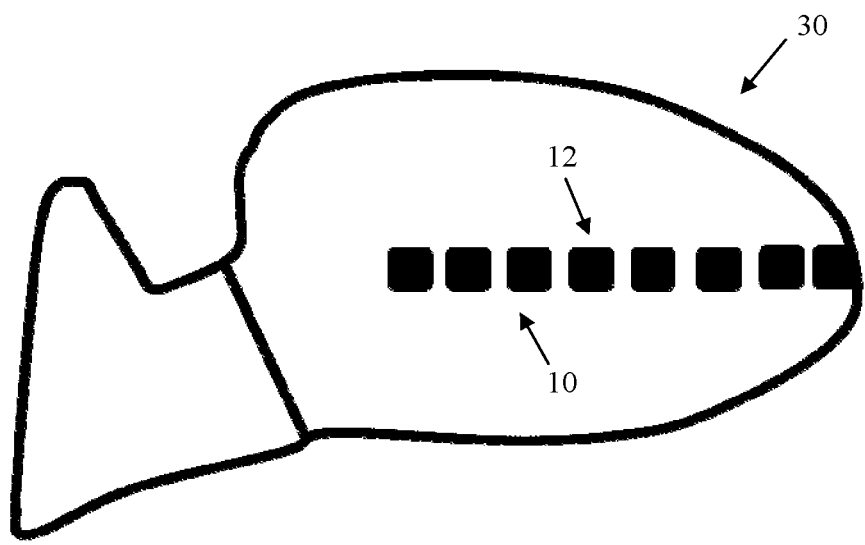

FIGS. 3*a*, 3*b* show a top view cross section and a front schematic view of a rear view device 30 having a light-guide 10 comprising a woven flat body 12 that is constructed as tight sinusoidal wave installed thereon. To create the effect of having multiple light sources installed, the woven flat body 12 is arranged in different depths following a sinusoidal wave as it can be best seen from FIG. 3*a*. However, the skilled person would know that other effects might be also realized, for example, by constructing the flat body 12 as triangular or trapezoidal wave. Also, the skilled person would know that a plurality of horizontally arranged light-guides 10 can be vertically constructed above each other.

The features disclosed in the specification, the claims and the figures may be important for the claimed invention, taken separately or in any combination, for the respective different embodiments.

REFERENCE NUMBER LIST 2 lighting device
4 light source
6 socket
8 optic element
10 light guide
12 woven flat body
14 optical fibers
16 coupling section
18 light decoupling section
20 illumination section
22 reflecting element
24 protection layer
26 coating
28 non-optical fibers
30 rear view mirror

The invention claimed is:

1. A light guide for a lighting device for a vehicle, comprising:
at least one woven flat body and a plurality of optical fibers, which at least partly build the flat body;
wherein all or some of the optical fibers comprise at least one coupling section, each coupling section is disposable or disposed in a socket of the lighting device to receive light from a light source of the lighting device, the optical fibers comprise at least one light decoupling section being part of at least one illumination section of the woven flat body, the at least one light decoupling section of the optical fibers comprises at least one reflecting element to decouple light from the optical fibers, and the reflecting element is used in the light decoupling section of the optical fibers,
wherein the woven flat body comprises at least one reflecting element to decouple light from the optical fibers, the at least one reflecting element comprises reflecting threads, shreds, and particles, and has a metallic surface.

2. The light guide of claim 1, wherein the woven flat body comprises at least one of non-optical fibers, fiberglass, Kevlar, carbon and cotton.

3. The light guide of claim 1, further comprising a protection layer covering at least one outer surface of the woven flat body.

4. The light guide of claim 1, wherein the protection layer comprises a translucent coating, and the light guide comprises an additional translucent, opaque and/or colored, coating.

5. The light guide of claim 1, wherein some or all of the optical fibers comprise a reflecting end portion.

6. The light guide of claim 1, further comprising:
first optical fibers disposed in or at a first socket and comprising a first light decoupling section that is part of a first illumination section of the woven flat body;
second optical fibers disposed in or at a second socket and comprising a second light decoupling section that is part of a second illumination section of the woven flat body; and
further optical fibers disposed in or at a further socket and comprising a further light decoupling section that is part of a further illumination section of the woven flat body.

7. The light guide of claim 1, wherein the woven flat body is flexible or stiff and the woven body is solvable; and attachable on a vehicle part or is integrated as insolvable body, in particular builds an outer cover for the vehicle part.

8. The light guide of claim 1, wherein the woven flat body is constructed as a tight sinusoidal wave for creating an effect of multiple light sources, and the light output is consistent along the illuminated length.

9. The light guide of claim 1, wherein the woven flat body is constructed as a flexible tube enabling the illumination section to be guided into position.

10. The light guide of claim 1, wherein the woven flat body enables curved sections to be created with a radius of curvature of 5 mm or less.

11. A lighting device for a vehicle comprising:
at least one light source comprising a light emitting diode (LED);
at least one socket for receiving light from the light source;
at least one light guide comprising the light guide of claim 1,
wherein all or some of the optical fibers comprise at least one coupling section, each coupling section is disposable or disposed in or at the at least one socket to receive light from the light source;
wherein the optical fibers comprise at least one light decoupling section that is part of at least one illumination section of the woven flat body; and
wherein at least one of the woven flat body and the at least one light decoupling section of the optical fibers comprises at least one reflecting element to decouple light from the optical fibers.

12. The light guide of claim 1 wherein the light guide is part of a vehicle part comprising at least one of a rear view mirror, an external camera, a camera pod, a turning signal, an interior light, frontlight, and a backlight.

13. The light guide of claim 6, wherein the first illumination section and the second illumination section are adapted to create colored streams of color; or segments of different color, and the first illumination section and the second illumination section are adapted to be turned off and on independently.

14. The lighting device of claim 11, wherein at least one of a lens, a prism, a filter and reflector is disposed between the light source and the at least one socket is configured to interact with the light emitted by the light source.

15. The lighting device of claim 11, further comprising:
at least one control unit configured to regulate at least one of intensity and color of the respective light emitted by the at least one light source.

16. The lighting device of claim 11, wherein the at least one light source comprises at least one RGB tri-color light emitting diode (LED) for variable output color.

17. The lighting device of claim 11, further comprising:
a plurality of light sources;
optic elements;
sockets;
bundles of optical fibers,
first optical fibers disposed in or at a first socket and comprising a first light decoupling section that is part of a first illumination section of the woven flat body;
second optical fibers disposed in or at a second socket and comprising a second light decoupling section that is part of a second illumination section of the woven flat body; and
further optical fibers disposed in or at a further socket and comprising a further light decoupling section that is part of a further illumination section of the woven flat body.

18. The lighting device of claim 11, wherein the light source is located away from the illumination section, and the light source is located several meters away from the illumination section, and wherein the light source is located in a dry area of the vehicle, and the illumination section is located in a wet area of the vehicle.

19. The light guide of claim 12, further comprising:
an outer cover the woven flat body that is solvable and attached to the woven flat body and the outer cover or the woven flat body is integrated as insolvable part of the outer cover.

* * * * *